(12) United States Patent
Karacal et al.

(10) Patent No.: US 8,740,708 B2
(45) Date of Patent: Jun. 3, 2014

(54) GUN HANDLE ATTACHMENT FOR GAME CONTROLLER

(75) Inventors: Ozhan Karacal, Pokfulam (HK); Christopher F. Richards, Fountain Hills, AZ (US); Nicholas Raymond Simmons, Studio City, CA (US)

(73) Assignee: Performance Designed Products LLC, Sherman Oaks, CA (US)

( * ) Notice: Subject to any disclaimer, the term of this patent is extended or adjusted under 35 U.S.C. 154(b) by 137 days.

(21) Appl. No.: 13/118,003

(22) Filed: May 27, 2011

(65) Prior Publication Data

US 2012/0302348 A1 Nov. 29, 2012

(51) Int. Cl.
*A63F 13/06* (2006.01)

(52) U.S. Cl.
USPC .................. 463/38; 463/46; 463/47

(58) Field of Classification Search
None
See application file for complete search history.

(56) References Cited

U.S. PATENT DOCUMENTS

| | | | | |
|---|---|---|---|---|
| 4,976,175 | A * | 12/1990 | Hung | 81/439 |
| 5,158,495 | A * | 10/1992 | Yonezawa | 446/456 |
| D614,624 | S * | 4/2010 | Zhang | D14/418 |
| D646,281 | S * | 10/2011 | Markowitz et al. | D14/418 |
| 8,057,309 | B1 * | 11/2011 | Mead et al. | 463/48 |
| D666,248 | S * | 8/2012 | Karacal et al. | D21/333 |
| 8,277,327 | B2 * | 10/2012 | Takeda et al. | 463/47 |
| 8,298,090 | B2 * | 10/2012 | Kazama et al. | 463/47 |
| 8,303,421 | B1 * | 11/2012 | Farley et al. | 463/53 |
| 8,313,379 | B2 * | 11/2012 | Ikeda et al. | 463/38 |
| 2003/0109314 | A1 * | 6/2003 | Ku | 463/47 |
| 2004/0033835 | A1 * | 2/2004 | Chao | 463/46 |
| 2005/0197178 | A1 * | 9/2005 | Villegas | 463/5 |
| 2008/0015017 | A1 * | 1/2008 | Ashida et al. | 463/37 |
| 2008/0070686 | A1 * | 3/2008 | Satsukawa et al. | 463/37 |
| 2008/0146336 | A1 * | 6/2008 | Feldman et al. | 463/37 |
| 2008/0171596 | A1 * | 7/2008 | Hsu | 463/39 |
| 2009/0133309 | A1 * | 5/2009 | Cahill | 42/72 |
| 2009/0233710 | A1 * | 9/2009 | Roberts | 463/30 |
| 2010/0173686 | A1 * | 7/2010 | Grant et al. | 463/2 |
| 2010/0261530 | A1 * | 10/2010 | Thomas et al. | 463/36 |
| 2010/0267454 | A1 * | 10/2010 | Navid | 463/37 |
| 2010/0279771 | A1 * | 11/2010 | Block et al. | 463/37 |
| 2011/0028217 | A1 * | 2/2011 | Chong | 463/37 |
| 2011/0034224 | A1 * | 2/2011 | Liu | 463/3 |
| 2011/0053691 | A1 * | 3/2011 | Bryant et al. | 463/37 |
| 2011/0092290 | A1 * | 4/2011 | Huebner et al. | 463/39 |
| 2011/0166824 | A1 * | 7/2011 | Haisty et al. | 702/157 |

(Continued)

OTHER PUBLICATIONS

Sean Colleil, Review—Nyko Action Pak, http://www.gamingnexus.com/article/nyko-action-pak/page2/item2, Dec. 23, 2009. gaming Nexus website.

(Continued)

*Primary Examiner* — Paul A D'Agostino
(74) *Attorney, Agent, or Firm* — Sheppard Mullin Richter & Hampton LLP (57) ABSTRACT

According to one embodiment, a controller attachment apparatus is provided configured to adapt a game controller having a battery compartment with a cover into a firearm-shaped game controller, the controller attachment apparatus comprising: a body; and a grip attached to and extending away from a rear section of the body; wherein the body comprises a cradle having a clip, the cradle configured to accept the game controller, the clip configured to selectively retain the game controller, and the cradle and clip further configured to attach to the game controller in place of the cover.

18 Claims, 8 Drawing Sheets

(56) References Cited

U.S. PATENT DOCUMENTS

| | | | |
|---|---|---|---|
| 2011/0172017 A1* | 7/2011 | Takahashi et al. | 463/39 |
| 2011/0263328 A1* | 10/2011 | Yamashita et al. | 463/36 |
| 2011/0275437 A1* | 11/2011 | Jennings et al. | 463/38 |
| 2011/0276891 A1* | 11/2011 | Ecko | 715/739 |
| 2012/0040758 A1* | 2/2012 | Hovseth | 463/37 |
| 2012/0136217 A1* | 5/2012 | Cheung Hyen et al. | 600/300 |

OTHER PUBLICATIONS

Jason Leavey, Review—Nyko Wand Action Pak (Wii), http://www.thetanooki.com/2010/09/09/review-nyko-wand-action-pak-wii/, Sep. 9, 2010. The Tanooki website.

* cited by examiner

GUN HANDLE ATTACHMENT FOR GAME CONTROLLER

FIELD OF INVENTION

The present invention relates to game accessories, and more particularly, some embodiments relate to an attachment apparatus for a controller, such as a computer controller or a video game controller.

DESCRIPTION OF THE RELATED ART

Modern interactive software programs, such as video games and the like, typically allow the user (e.g., a player of a video game) to provide some form of input through a device. For example, for today's typical desktop or laptop computer, the popular form of user input is through a keyboard and mouse. Within the realm of video games, the preferred form of input is through use of a game controller of one form or another. In one example, a controller might be a handheld controller that has input features such as a plurality of buttons, analog joysticks, a D-pad directional control, motion sensors (e.g., accelerometers), as well as others that provide a means for a gamer (i.e. video game player) to input desired control commands to the video game software. In turn, the inputted control commands would typically affect the game activity on the video screen.

For example, a typical controller for a Sony® PlayStation®, Microsoft® XBOX 360®, or Nintendo® Wii® gaming console is typically connected to the gaming console through a wire or wirelessly and comprises multiple buttons (for example X, O, Δ, □ or X, A, B, Y buttons, trigger buttons) and directional inputs (e.g., analog joysticks, four-way D-Pads). Other video game controllers include those built into hand-held game systems (e.g., Nintendo DS®, Sony® PSP®). For some of these controllers, such as the controllers for the Nintendo® Wii® gaming console, the controllers are also equipped with sensors that allow the gaming console to detect, among other things, when a controller is moving, in what manner a controller is moving, and the location of a controller with respect to a display output device. Such features enhance the gaming experience by increasing the level interaction between a gamer and a gaming console.

In some cases, the physical form of the controller can further enhance the gaming experience. For example, a controller might be configured as a joystick as is popular for flight simulator games, a steering wheel and pedal combination as is popular for driving games, and guitar or other musical instruments for interactive music-based games. With respect to video games based on shooting action, the controller may take the form of handheld or shoulder-held firearms, both known and fictional. For example, for a first-person shooting military game, the controller may take the form of a known rifle or a handgun, while for first-person shooting game based in space, the controller may take the form of a laser gun or phaser. In other examples, the controller may take the generic form of a hand-held firearm, comprising a muzzle, a handle and a trigger.

BRIEF SUMMARY OF EMBODIMENTS OF THE INVENTION

According to various embodiments of the invention, a controller apparatus is provided and, more specifically, for some embodiments an attachment apparatus is provided that is combinable with a computer or video game controller.

According to one embodiment, a controller attachment apparatus is provided configured to adapt a game controller having a battery compartment with a cover into a firearm-shaped game controller, the controller attachment apparatus comprising: a body; and a grip attached to and extending away (i.e., downward) from a rear section of the body; wherein the body comprises a cradle having a clip, the cradle configured to accept the game controller, the clip configured to selectively retain the game controller, and the cradle and clip further configured to attach to the game controller in place of the cover. For example, where the body has a top side comprising the cradle configured to accept the game controller, and a bottom side opposite the top side, the grip may be attached and extend substantially orthogonal from the bottom side (e.g., at 50 degree angle). The controller attachment apparatus may further comprise: a first trigger disposed on the grip near where the body attaches to the grip; and a means attached to the first trigger, the means configured to actuate a second trigger on the game controller when the first trigger is actuated. Additionally, in some embodiments, the grip comprises a socket configured to accept and selectively retain the cover.

According to another embodiment, a controller attachment apparatus is provided, comprising: a handle; a coupling mechanism attached to the handle configured to accept a controller, the coupling mechanism designed to attach to a compartment of the controller and comprising a holding mechanism, the holding mechanism designed to selectively retain the compartment once the controller is attached to the coupling mechanism.

In various embodiments, the controller attachment apparatus further comprises: a first button disposed on the handle; and a means for actuating a second button on the controller when the first button is actuated. In some such embodiments, the first button is a first trigger button and, in further such embodiments, the second button may be a second trigger button.

In some embodiments, the compartment that the holding mechanism is designed to selectively retain is a battery compartment of the controller and, in some such embodiments, the coupling mechanism is designed to replace a panel of the battery compartment.

In additional embodiments, the coupling mechanism is designed to replace a panel of the compartment and the handle comprises a socket designed to accept and selectively retain the panel. In further embodiments, the holding mechanism is designed to retain the compartment by way of structural features disposed within the compartment. Additionally, the holding mechanism in some embodiments may comprise a switch configured to selectively release the controller after the controller has been selectively retained by the holding mechanism. In more embodiments, the handle is oriented to the coupling mechanism such that when the controller is attached to the controller coupling mechanism, the controller attachment apparatus is shaped similar to a handheld firearm.

In further embodiments, the coupling mechanism further comprises: a first button disposed on the coupling mechanism; and a means for actuating a second button within the compartment of the controller when the coupling mechanism is attached to the compartment of the controller and the first button is actuated.

In some embodiments, the controller attachment apparatus further comprises a biosensor module configured to sense a biological condition of a user of the controller attachment apparatus and to send an information representative of the biological condition to the controller via a communication interface. In some such embodiments, the biosensor module comprises a moisture sensor. In other such embodiments, the biosensor module comprises a plurality of electrodes disposed on the handle. Additionally, the representative biological information may comprise a heart rate or a temperature of the user of the game controller.

In further embodiments, the controller attachment apparatus further comprises a stimulus module configured to receive an instruction from the controller and to apply a sensory feedback to the user of the controller attachment apparatus. In some such embodiments, the sensory feedback is an electric shock or a change of temperature.

In other embodiments, the sensory feedback is using the controller apparatus to recoil. Such an action could, for example, simulate the recoil of a firearm being discharged. Depending on the embodiment, the recoil may be simulated by way of a stimulus module comprising a solenoid. For instance, the solenoid may include a rod that moves in a motion perpendicular to the grip/handle when the recoil action is activated. Then, when the recoil action is be activated (e.g., when the trigger on the controller apparatus is depressed or squeezed), the solenoid would move the rod in such a manner as to cause the controller apparatus, which is attached to a video game controller, to produce a recoil movement. Other embodiments may utilize mechanisms other than solenoids to create the recoil action described herein.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

Some of the figures included herein illustrate various embodiments of the invention from different viewing angles. Although the accompanying descriptive text may refer to such views as "top," "bottom" or "side" views, such references are merely descriptive and do not imply or require that the invention be implemented or used in a particular spatial orientation unless explicitly stated otherwise.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

DETAILED DESCRIPTION OF THE EMBODIMENTS OF THE INVENTION

The present invention is directed toward accessories and attachments for handheld controllers such as, for example, computer or video game controllers. For example, in a video game environment, a controller attachment apparatus according to the embodiment may include a handle; a coupling mechanism attached to the handle configured to accept a controller, the coupling mechanism designed to attach to a compartment of the controller and comprising a holding mechanism, the holding mechanism designed to selectively retain the compartment once the controller is attached to the coupling mechanism. The coupling mechanism may comprise a cradle, bay, cavity, recess or cut-away portion configured to hold a game controller (such as a Wii® motion controller).

In some examples, the controller attachment apparatus may be fashioned in the shape of a weapon, such as a handgun, a shoulder-held/shoulder-fired firearm, a phaser, or a laser gun. By combining a controller with such an attachment apparatus, a firearm-shaped controller device is formed that not only gives the controller a firearm-like look and feel, but also allows a user to more naturally input vertical and horizontal and tilt information to a computer game or video game. For example, such an apparatus when combined with a controller can assist a user in properly aiming the controller like a firearm during a first-person shooter game.

Before describing the invention in detail, it is useful to describe a few example environments with which the invention an be implemented. One such example is that of a computing system, such as a gaming system, used by one or more participants, such as video game players (gamers) to participate in a group activity, such as playing a computer game or video game.

Figure 1:
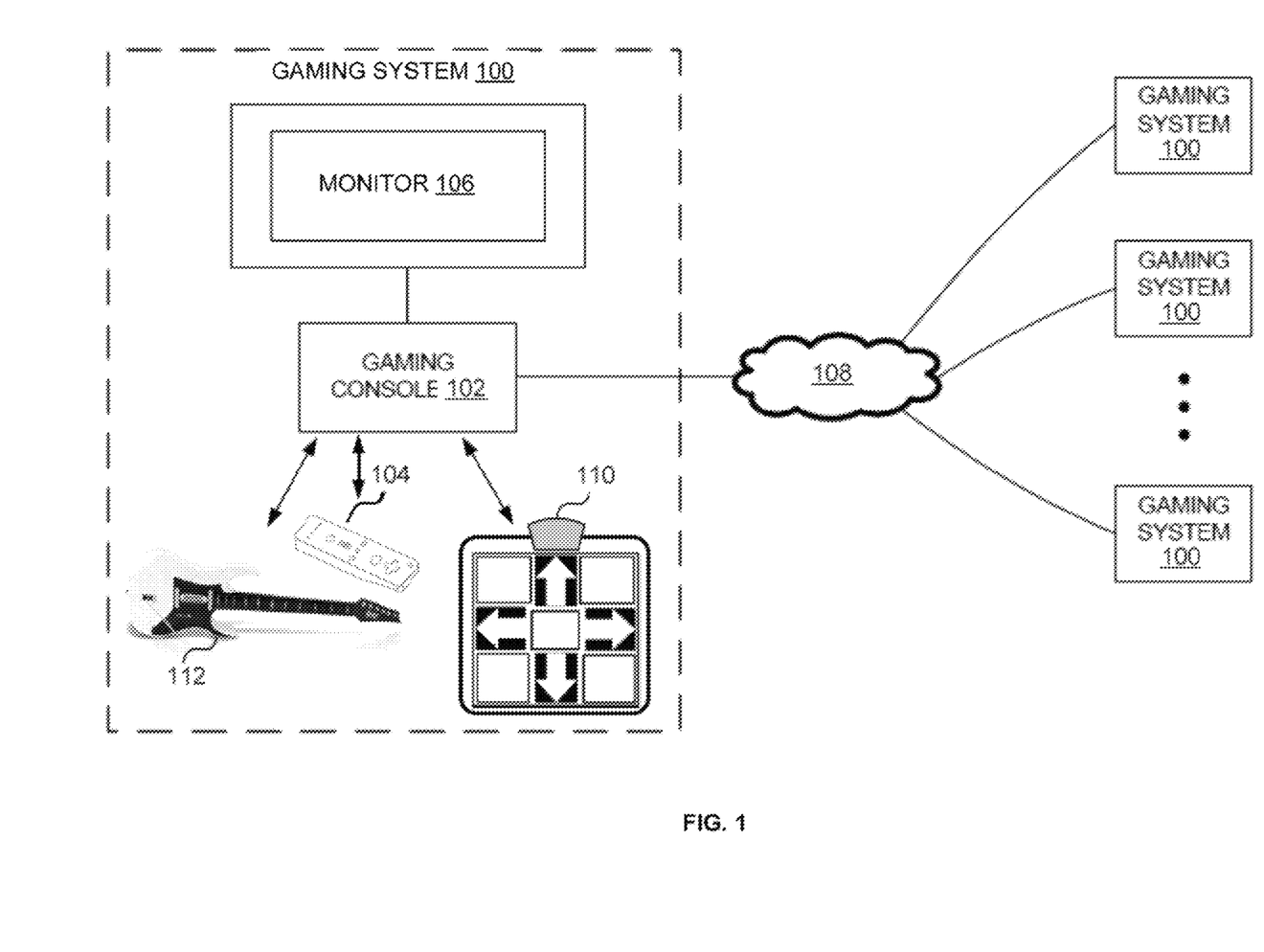
FIG. 1 is a block diagram illustrating an example gaming environment with which at least one embodiment of the present invention can be used.

FIG. 1 is a block diagram illustrating a generalized version of a gaming system 100 as one example of an environment with which the invention can be implemented. Referring now to FIG. 1, the example gaming system includes a gaming console 102, a monitor 106, and a variety of controllers such as a dance pad game controller 110, and a musical-instrument game controller 112, and a traditional game controller 104. The illustrated example also includes an interface to a communication medium or communication network 108 such as, for example, the Internet or other communication channel.

In one environment, gaming console 102 might be implemented as a PlayStation®, XBOX 360®, Wii® or other like gaming console. In another implementation, gaming console 102 might be implemented as a personal computer or other like computing device. A gaming console 102 would typically include a processor or other computing device providing the ability to allow gaming applications, which are typically software applications, to be run thereon. A gaming application might be installed, for example, through the use of CD ROM drives, DVD drives, or other storage medium or communications interfaces. Typically, a gaming console 102 can be analogized to a computer or computing system to run the gaming software. In another environment, the gaming console 102 might be implemented as a personal computer.

A monitor 106 is typically provided to allow the gaming environment to be displayed to the gamer during game play. Monitor 106 can also be used to display menus and other features to the gamer to enhance the game play environment. Various interfaces might be provided between gaming console 102 and monitor 106 to provide the proper video signal to drive monitor 106. For example, RGB, NTSC, VGA, and other signal types or specifications can be used to provide communications between gaming console 102 and monitor 106. Alternatively, a video projector or other viewing mechanism (not shown) can be utilized in place of the monitor 106 to provide similar display functionality.

As illustrated, speakers can also be provided, separately or with monitor 106, to provide audible information to the gamer during game play and setup. For example, in one embodiment, monitor 106 might be implemented as a television with built in speakers that is connected to the gaming console via a coaxial or other audio and video input.

Gaming controller 104 can be used to allow gamers to provide input to the game software as well as to receive feedback from the game software during setup and game play. As described above, controller 104 can include, for example, X, Y, A, B buttons, trigger buttons, analog joysticks, key pads, and other devices to allow the user to provide input to the game. By actuating these various buttons, switches or joysticks, the gamer can control the operation of the game, such as controlling characters or vehicles in the game. The interface between gaming console 102 and controller 104, dance pad game controller 110, and musical-instrument game controller 112 might be either wired or wireless interfaces as may be desired. Likewise, throughout this document, references to communication or signal interfaces can be implemented using wired or wireless interfaces, unless otherwise specified.

Also illustrated in the example of FIG. 1 is a communications connection to a network 108. For example, a user may wish to connect the gaming console 102 to the internet or other communication medium whereby game information can be downloaded or uploaded to various websites, online services such as XBOX Live™, or other entities or services. In addition, through a communication medium 108, gamers might compete amongst other garners at their gaming systems 100, even if such other gainers at remote or distant locations. Note that depending on the gaming environment, remote gaming systems 100 might or might not have similar configurations to one another.

Although not depicted, game system 100 can have feedback devices, or stimulus, that can be used to provide sensory feedback from the gaming console to the user. The game system 100 can also have biosensors allowing for bioinformation (e.g., biometrics) regarding the user to provide to the console. Both the biosensors and feedback devices can communicate to the gaming console 102 via a separate communication path from the controllers 104, 110, and 112. For example, feedback devices can communicate through the USB ports or like communication ports as those found on gaming consoles such as the XBOX 360®, PlayStation® and personal computing system. Biosensors and feedback devices can also be configured to connect through ports of handheld gaming consoles 102, often referred to as expansion ports. As a further example, biosensors and feedback devices can communicate with gaming consoles 102 via wireless communication interfaces.

In yet another embodiment, feedback devices and biosensors can communicate with the gaming console via a communication path through the gaming controller 104. For example, the communication controller can be equipped with another communication interface and the biosensors, feedback devices, or both are communicatively coupled (whether hard wired or wirelessly) to the gaming controller 104. As one specific example of this case, a biosensor and feedback device can be configured for communicative coupling to a Wii® controller via the Wii® controller's Wii Nunchuck® pass-through port. As these examples illustrate, there are a number of mechanisms by which a biosensor or feedback device can be interfaced to a controller or to the gaming console.

It should be understood by those of ordinary skill in the art that environments described above allow the various features and embodiments of the invention to be portrayed in the context of an exemplary application. After reading this description, it will become apparent to one of ordinary skill in the art how embodiments of the invention can be implemented in different and alternative environments.

Figures 2A, 2B, 2C:
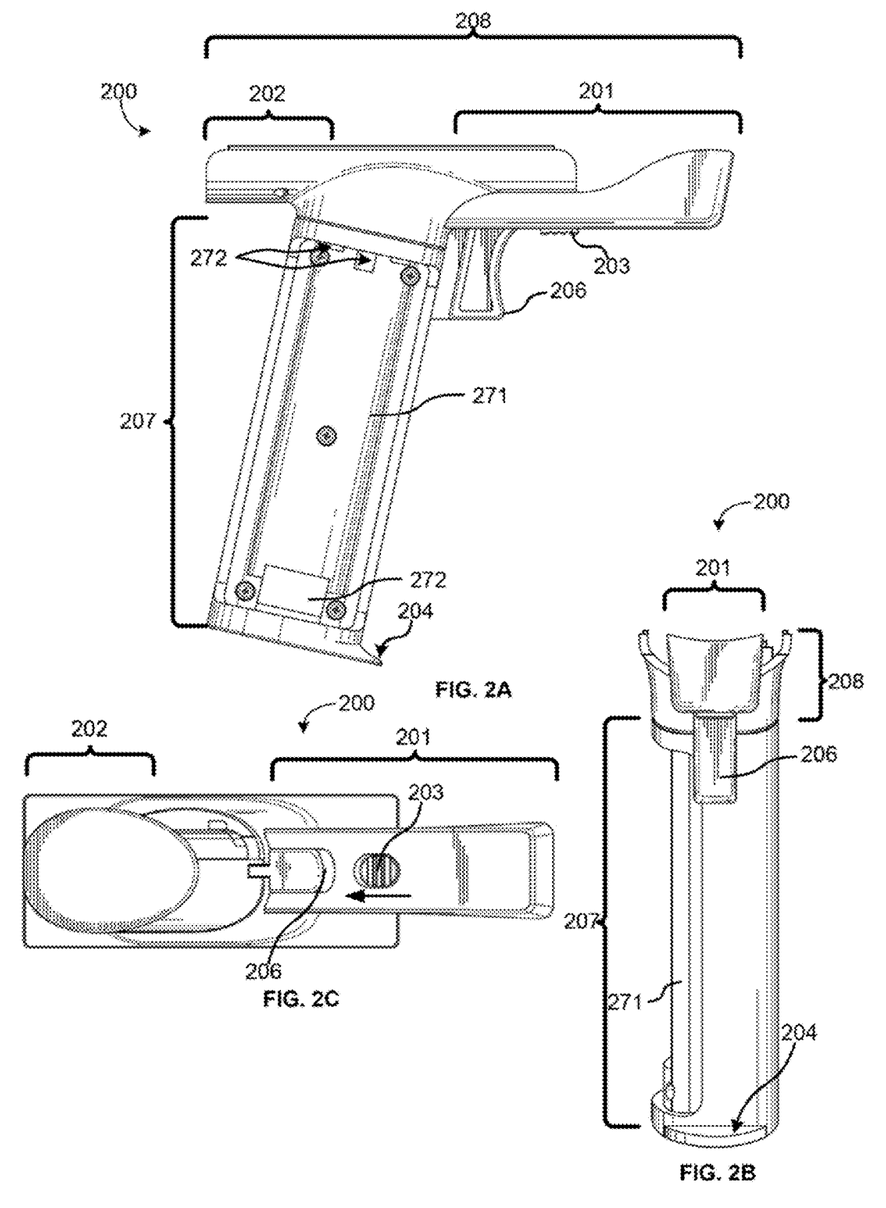
FIGS. 2A-2E are diagrams illustrating an example controller attachment apparatus in accordance with one embodiment of the present invention.

FIGS. 2A-2E are diagrams illustrating an example controller attachment apparatus 200 in accordance with one embodiment of present invention. Referring now to FIG. 2A, a side view of the apparatus 200 is provided depicting a body 208 configured to receive a controller, a grip 207 attached to the body, a trigger 206 disposed where the grip 207 meets the body 208 and a controller release slider switch 203 located disposed on the body 208. In whole, the apparatus 200 illustrated has shape substantially similar to a handheld firearm. FIGS. 2B and 2C provide additional front and bottoms views of the apparatus 200.

As shown in FIGS. 2A-2C, the body 208 of the apparatus 200 is an elongated element with a front portion 201 resembling the barrel or the barrel support of a handheld firearm, and a back portion 202 resembling the section of a handheld firearm where the hammer is typically located. The trigger 206 extends from the body 208 and is positioned in front of the grip 207 of the apparatus 200. Additionally, although not illustrated, for some embodiments a trigger guard may be positioned in front of the trigger to prevent unintentional actuation of the trigger, and to add to overall the realism of the apparatus 200 as being a firearm. The body 208 here is further equipped with a slide switch 203 that facilitates the release of a controller attached to the apparatus 200, More with regard to releasing a controller will be described later with reference to FIGS. 2D and 2E.

As shown, the body 208 is configured to receive and retain a substantially rectangular-shaped controller that sits on top of the body 208, such as a Wii® controller. From reading this description, one of ordinary skill in the art would appreciate and understand that other embodiments in accordance with the invention may be configured to attach to controllers having a form-factor different from those illustrated or described herein.

The grip 207 is shown to be extending from the body 208 at an angle common for handheld firearms, and has is configured with a socket portion 271 configured to receive, retain and store a controller's compartment panel. Typically, the panel stored by the socket 271 is that of the compartment to which the apparatus 200 attaches. In some embodiments, the grip 207 may be further configured with features commonly found on the grips equipped on handheld firearms. For example, the grip may have aesthetic features that give the grip a gun-like appearance, thereby adding to the realism of the apparatus. In the illustrated example, the grip is configured with a protrusion 204 that adds to the gun-like feel of the apparatus 200.

Figure 2D:
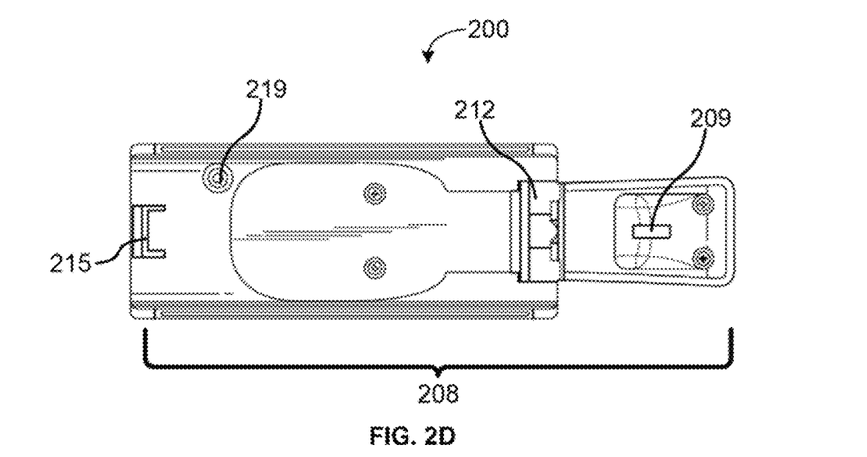
Figure 2E:
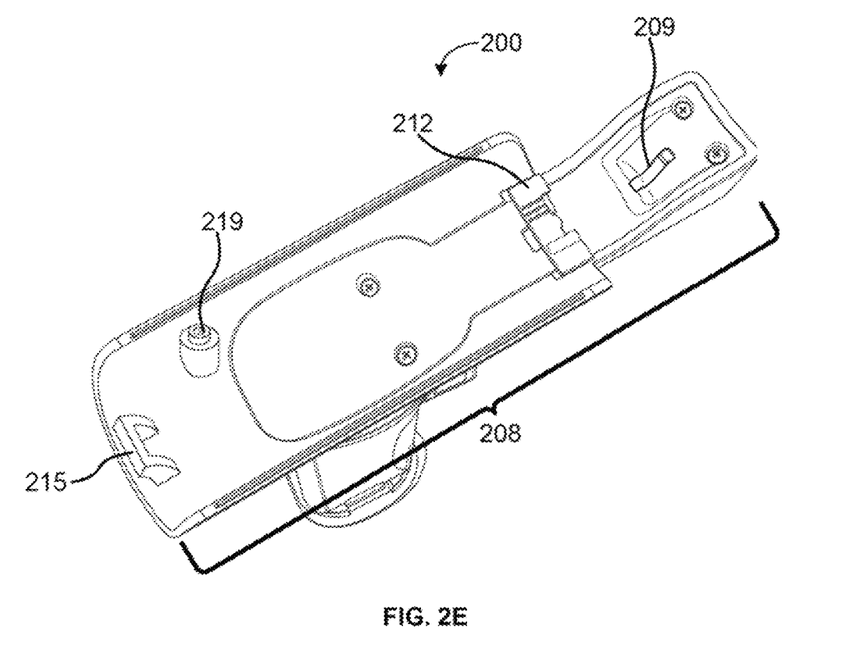

For more detail regarding the body 208, we now turn to FIGS. 2D and 2E, which respectively provide a top view and a perspective top view of apparatus 200. As depicted, the top portion of body 208 depicted functions as a coupling mechanism and, in particular, is configured to attach to a controller by attaching to a compartment of a controller. As noted above, in some embodiments the coupling mechanism of the body 208 may be a cradle, cavity, bay, recess or cut-away configured to receive and hold a controller. One of ordinary skill in the art would appreciate that various embodiment may be equipped with alternative coupling mechanisms, which may vary in shape, without departing from the scope of the invention.

Continuing with reference to FIGS. 2D and 2E, the body 208 of apparatus 200 shown to be configured with a holding mechanism comprising clip features 215 and 212. Although both clip features 215 and 212 are shaped such that each can mate with a corresponding structural feature of a controller's compartment, clip feature 215 is a static feature while clip feature 212 is a non-static feature, configured to be selectively displaced when a user wants to separate a controller from apparatus 200. More with regard to clip feature 212 will be discussed later with respect to FIG. 3A. Although only clip features are depicted and described, it will be understood and appreciated by those of skill in the art that other means for holding a controller to the apparatus could be utilized in place of, or in addition to, the clip features without departing from the spirit of the present invention. For example, the body 208 could be configured with tab features that correspond to structural features of a controller, thereby assisting in securing the apparatus 200 to a controller. Further, though not shown, in other embodiments, the Depending on the embodiment, the coupling mechanism of body 208 may be configured with a means for actuating a button or switch located in the compartment of a controller, thereby allowing a user to access a button or switch within the compartment that would otherwise be inaccessible once the apparatus 200 is attached to the controller. For example, a button means 219 may be disposed through the body 208 such that when a controller is attached to the apparatus, a user may actuate a button disposed within the controller's compartment without the need to detach the controller from the apparatus. Similarly, body 208 is also configured with a trigger means 209 that, once the apparatus 200 is attached to the controller, enables a user to actuate a trigger disposed on the controller. More with regard to trigger actuators is discussed with respect to FIG. 3B.

Figure 3A:
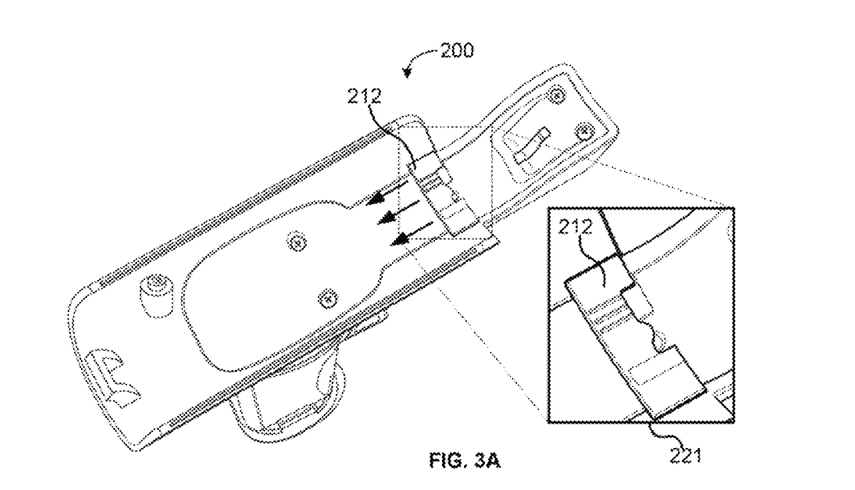
FIGS. 3A-3B are diagrams illustrating use of the holding mechanism and the trigger mechanism of the example controller attachment apparatus illustrated in FIGS. 2A-2E.

Referring now to FIG. 3A, the clip feature 212 is depicted in its selectively displaced orientation. In some embodiments, the clip feature 212 is controlled by the user using slider switch 203. For example, when a user wants to release a controller form the apparatus 200, the user would simply slide the slide switch 203 towards the rear of the apparatus 200, thereby causing the clip feature 212 to move in the same direction backwards, as shown in view 221. By doing so, the clip feature 212 detaches itself from those structure features of the controller utilized to secure the apparatus 200 to the controller.

In another example, an apparatus 200 may comprise a body 208 configured with tracks that cause a controller to attach to the apparatus when the controller is slid in a first direction with respect to the body (e.g., 208), and release from the apparatus when the controller is slid in a second (opposite) direction with respect to the body (e.g., 208). The body of this example apparatus may further comprise a locking mechanism that prevents the controller from sliding in the second direction with respect to the body once the controller is secured to the body by the sliding action in the first direction. For instance, a pin mechanism can be utilized to engage the controller once the controller is slid into place, and the pin mechanism may be controlled by the slider switch 203. In alternative embodiments, the slider switch 203 may be replaced by other control mechanisms that can similarly control the release of the controller from the apparatus such as a button or a tab.

Figure 3B:
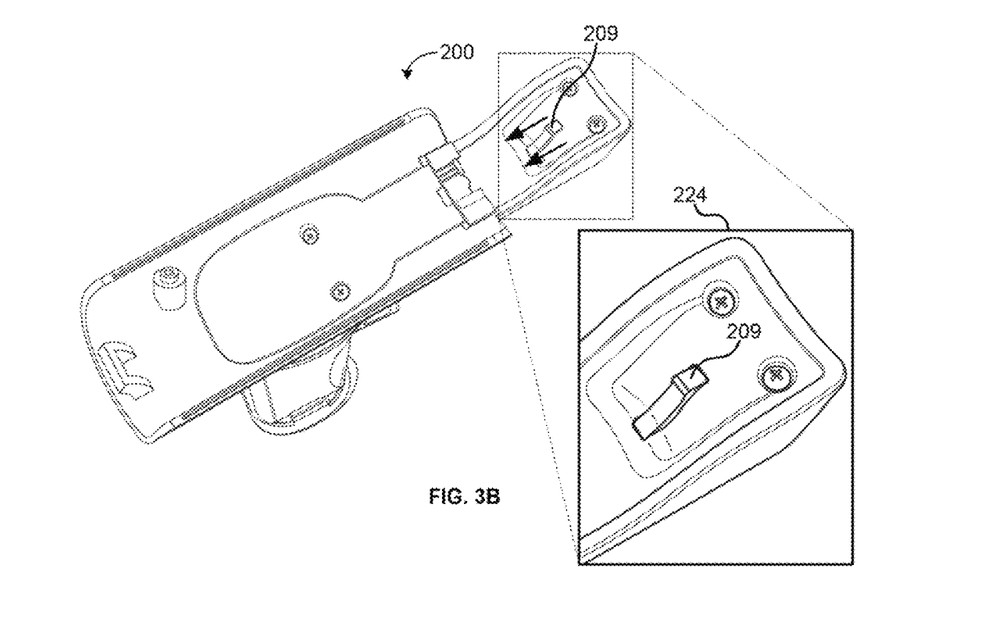

Similarly, with reference to FIG. 3b, trigger means 209 is depicted in its displaced position. In some embodiment, the trigger means 209 is controller by the user using the trigger 206. In such embodiments, when the user wants to actuate the trigger of a controller attached to the apparatus, that user would simply pull back on the trigger causing the trigger means 209 to protrude, causing the trigger button on the underside of a controller to be actuated. View 224 provides a depiction of the trigger means 209 protruding.

Figure 4:
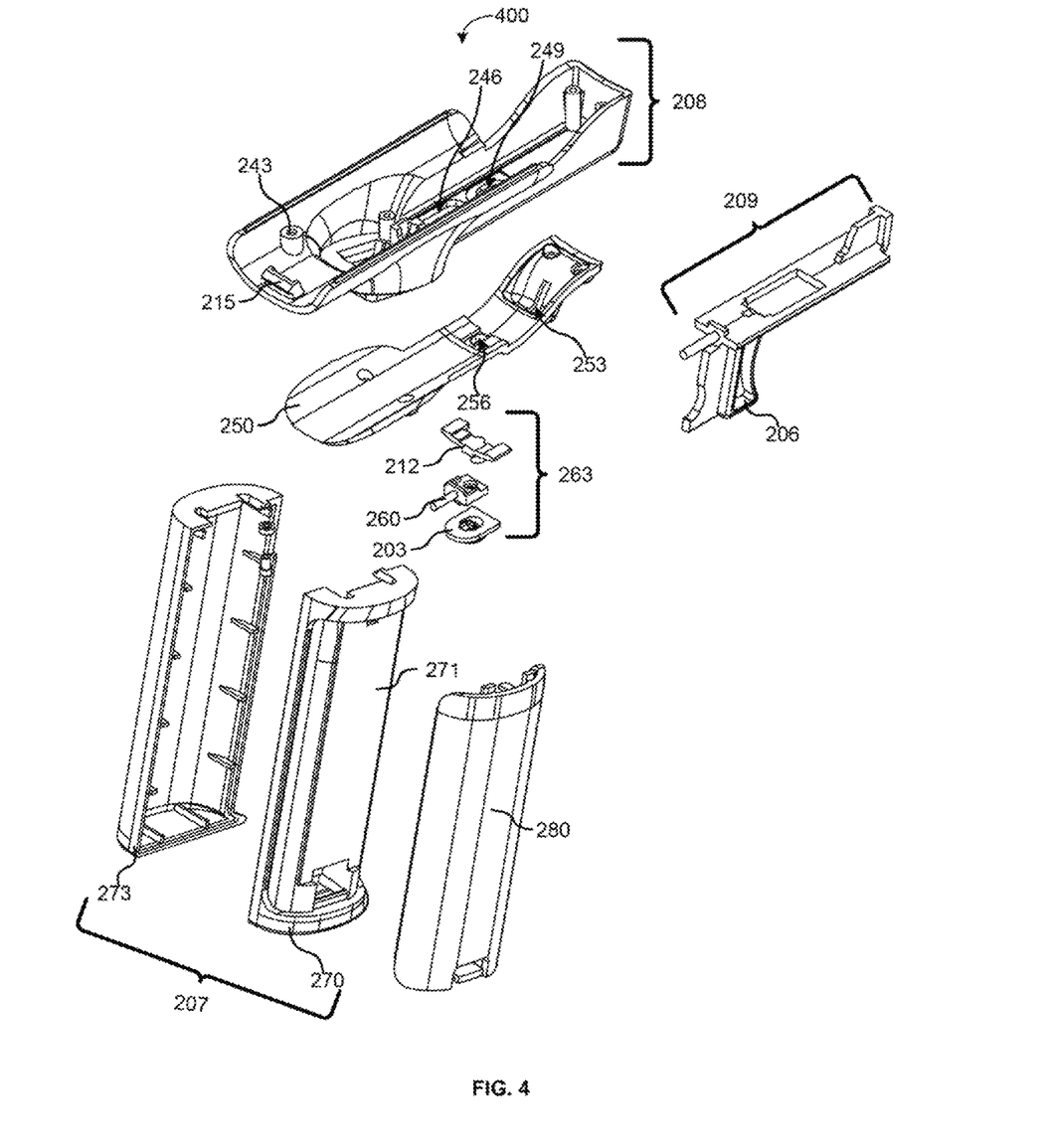
FIG. 4 is a diagram illustrating an exploded view of the controller attachment apparatus in accordance with one embodiment of the invention

FIG. 4 is a diagram illustrating an exploded view of the controller attachment apparatus 200, which provides a depiction of example implementations of the button means and trigger means. Specifically, FIG. 4 shows the trigger means 209, and how its attached to the trigger 206; handle portion 207 comprising of a left half 273 and a right half 270; and a clip feature 212, which combines with slider switch 203 vis-à-vis component 260 to form a slider assembly 263. Also illustrated is body 208, comprising a cavity to contain trigger means 209 and slider assembly 263; several openings (243, 246, and 249) for the various button actuating means (e.g., trigger means 209, button means 219); and a covering 250 having openings (256, 253) that correspond to trigger means 209 and the slider assembly means 263. Though the trigger means 209 is depicted a single piece that slides within the body when the trigger 206 is actuated, is should be understood by those of ordinary skill that the trigger means 209 may be implemented using multiple components that create a trigger means assembly. Additionally, although not shown, a resilient element, such as a spring, may be utilized in conjunction with the trigger means 209 or slider assembly 263 to assist a user in actuating the means causing them to slide).

In addition, the right half 270 of the handle 207 comprises a socket 271 configured to receive and retain a controller cover/panel 280. In some embodiments, the cover/panel 280 received and retained by socket 271 is the cover/panel of the controller's compartment to which body 208 attaches. More with respect to cover/panel 280 is discussed with respect to FIGS. 5A-5D, which illustrate the use of the controller attachment apparatus 200 with an example game controller 500.

Figure 5A:
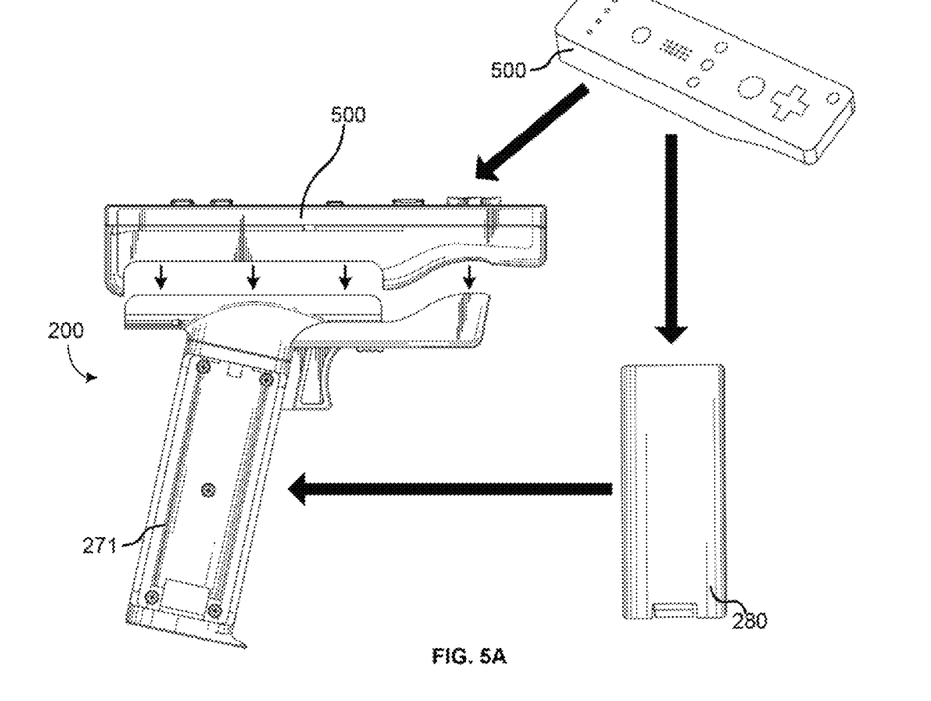
FIGS. 5A-5D are diagrams illustrating the use of the controller attachment apparatus of FIGS. 2A-2E with an example game controller.
Figure 5B:
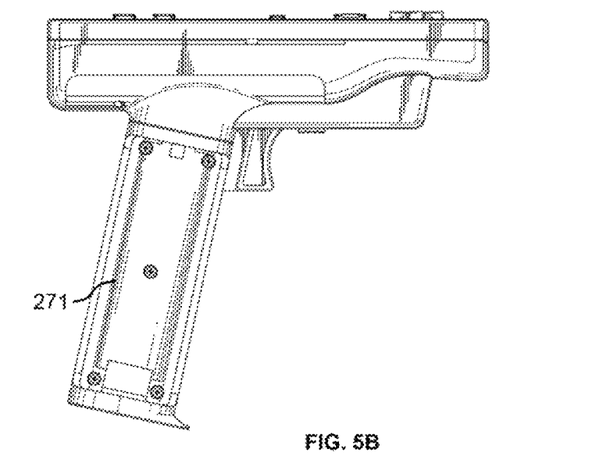

Referring now to FIGS. 5A-5D, in FIG. 5A a controller 500 is shown separated from its battery compartment panel 280. Once separated, apparatus 200 attaches to the battery compartment of controller 500 and takes the place of panel 280. FIG. 5B shows how the controller 500 appears once it is successfully attached to apparatus 200. It should be noted that although the illustrated embodiment depicts the apparatus 200 attached to the controller 500 at its battery compartment, one of ordinary skill in the art would understand and appreciate that other apparatuses in accordance with an embodiment of the invention can connect to other compartments on a controller and, optionally, have a socket on the handle configured to receive and retain the cover/panel of the compartment to which the apparatus attaches.

Figure 5C:
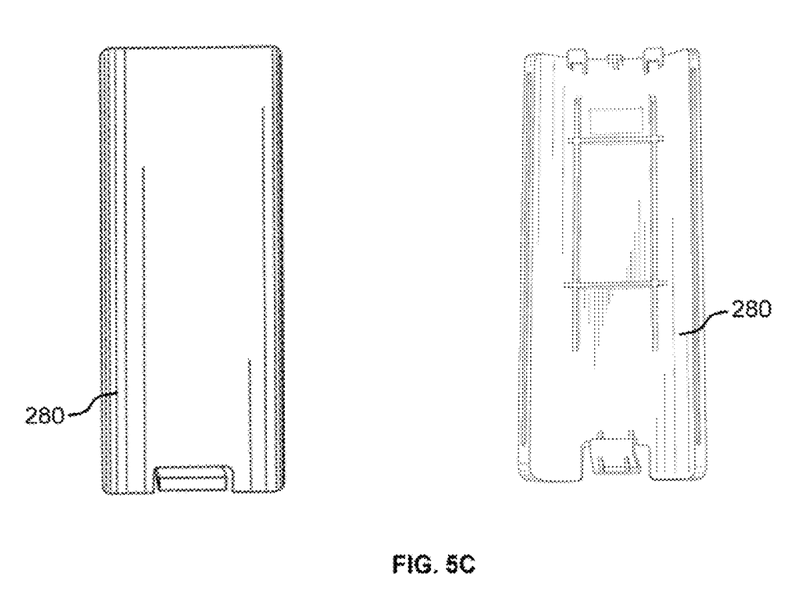
Figure 5D:
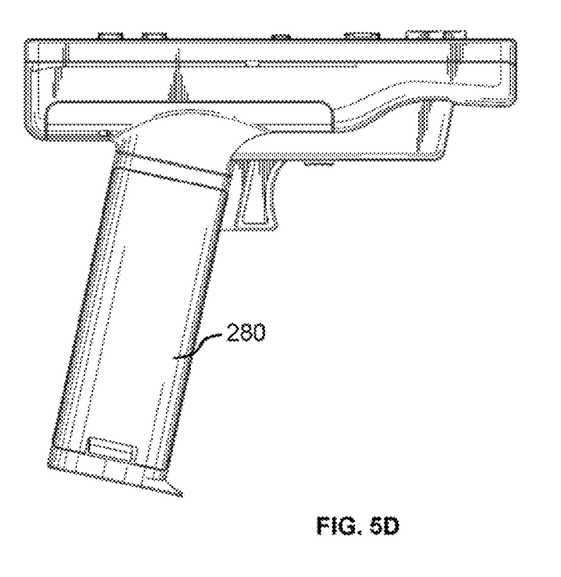

Continuing with FIG. 5C, the front and back of battery panel 280 is shown in greater detail. As depicted in FIG. 5D, the battery panel 280, which is displaced by the attachment of apparatus 200 to the controller 500, is attached to the handle vis-à-vis a properly configured socket.

Figure 6:
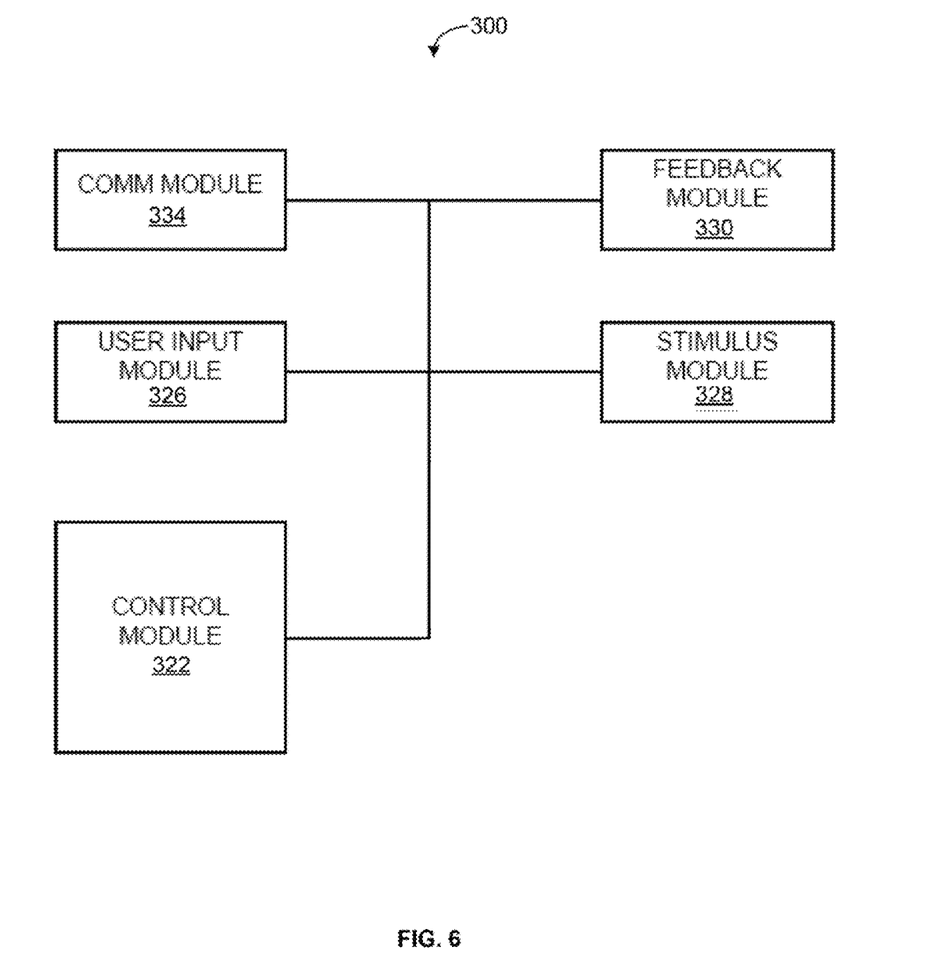
FIG. 6 is a diagram illustrating an example functional block diagram of the various modules of a controller apparatus in accordance with one embodiment of the invention.

FIG. 6 is a diagram illustrating an example functional block diagram of a controller in accordance with one embodiment of the invention. Referring now to FIG. 6, the example controller includes a control module 322, an input module 326, a stimulus module 328, and a biosensor module 330. Also a communication interface module 334 is provided to enable communication between the controller attachment apparatus and other units, such as, the controller to which the controller attachment is attached or a gaming console. One or more biosensor modules 330 might be provided to receive data from the biological or physiological sensors and, either alone or in combination with control module 322, convert those signals into appropriate data representations that can be properly interpreted by the game application or game driver to sense the biofeedback and operate on it accordingly. For example, a heart rate signal might be converted into an 8 bit PCM data stream that can be sent to the game application by way of communication interface module 334.

Stimulus module 328 can be provided to provide the appropriate signals to drive electrodes or other contacts that might be installed on the controller attachment apparatus to provide the desired stimulus. For example, stimulus module 328 might be comprised for a TENS circuit driven by a game to provide the appropriate levels of current to the electrodes to provide the electro stimulus. Likewise, stimulus module 328 might be implemented as selectable drivers to provide the appropriate current in the desired polarity to Peltier devices to adjust the temperature that is experienced by the game while playing the game.

User input module 326 can also be implemented to include appropriate receivers, analog-to-digital converters to accept user input of buttons, joysticks and other switches that may be located on the controller attachment apparatus. Optionally, an auxiliary display module (not shown) may be included to implement the appropriate converters and drivers needed to provide a still or motion image signal to an optional auxiliary display that may be disposed on the controller attachment apparatus. An auxiliary display module might also be used to provide soft or hard menus and cursors to allow setup selection for game or controller operations locally to the controller. Thus, for example, the display module might be used to allow the gamer to reprogram or reconfigure the controller independently of a gaming application.

A control module 322 may be provided to control various operations of the controller. For example, a processor or processors system can be provided to control the various operations of controller.

As used herein, the term module is used to describe a given unit of functionality that can be performed in accordance with one or more embodiments of the present invention. As used herein, a module can be implemented utilizing any form of hardware, software, or a combination thereof. In implementation, the various modules described herein can be implemented as discrete modules or the functions and features described can be shared in part or in total among one or more modules. In other words, as would be apparent to one of ordinary skill in the art after reading this description, the various features and functionality described herein may be implemented in any given application can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof: the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

What is claimed is:

1. A controller attachment apparatus configured to adapt a game controller having a battery compartment with a cover into a firearm-shaped game controller, the controller attachment apparatus comprising:
    a body; and
    a grip attached to and extending away from a rear section of the body;
    wherein the body comprises a cradle having a clip, the cradle configured to accept the game controller, the clip configured to selectively retain the game controller, and the cradle and clip further configured to attach to the game controller in place of the cover; and
    wherein the grip comprises a socket configured to accept and selectively retain the cover.

2. The controller attachment apparatus of claim 1, further comprising:
    a first trigger disposed on the grip near where the body attaches to the grip; and
    a means attached to the first trigger, the means configured to actuate a second trigger on the game controller when the first trigger is actuated.

3. A controller attachment apparatus, comprising:

a handle; and a coupling mechanism attached to the handle configured to accept a controller, the coupling mechanism designed to attach to a battery compartment with a panel of the controller and comprising a holding mechanism, the holding mechanism designed to selectively retain the battery compartment once the controller is attached to the coupling mechanism, wherein the coupling mechanism and holding mechanism are configured to attach to the battery compartment in place of the panel;

wherein the coupling mechanism is designed to replace the panel of the compartment; and wherein the handle comprises a socket designed to accept and selectively retain the panel.

4. The controller attachment apparatus of claim 3, further comprising:

a first button disposed on the handle; and a means for actuating a second button on the controller when the first button is actuated.

5. The controller attachment apparatus of claim 4, wherein the first button is a first trigger button.

6. The controller attachment apparatus of claim 4, wherein the second button is a second trigger button.

7. The controller attachment apparatus of claim 3, wherein the holding mechanism is designed to retain the compartment by way of structural features disposed within the compartment.

8. The controller attachment apparatus of claim 3, wherein the handle is oriented to the coupling mechanism such that when the controller is attached to the coupling mechanism, the controller attachment apparatus is shaped similar to a handheld firearm.

9. The controller attachment apparatus of claim 3, further comprising a biosensor module configured to sense a biological condition of a user of the controller attachment apparatus and to send an information representative of the biological condition to the controller via a communication interface.

10. The controller attachment apparatus of claim 9, wherein the biosensor module comprises a moisture sensor.

11. The controller attachment apparatus of claim 9, wherein the biosensor module comprises a plurality of electrodes disposed on the handle.

12. The controller attachment apparatus of claim 9, wherein the representative biological information comprises a heart rate or a temperature of the user of the game controller.

13. The controller attachment apparatus of claim 9, wherein the representative biological information comprises an amount of pressure the user of the game controller is exerting on the biosensor module.

14. The controller attachment apparatus of claim 3, further comprising a stimulus module configured to receive an instruction from the controller and to apply a sensory feedback to the user of the controller attachment apparatus.

15. The controller attachment apparatus of claim 14, wherein the sensory feedback is an electric shock or a change of temperature.

16. The controller attachment apparatus of claim 14, wherein the sensory feedback causes the controller attachment apparatus to recoil.

17. The controller attachment apparatus of claim 3, wherein the holding mechanism comprises a switch configured to selectively release the controller after the controller has been selectively retained by the holding mechanism.

18. The controller attachment apparatus of claim 3, wherein the coupling mechanism further comprises:

a first button disposed on the coupling mechanism; and a means for actuating a second button within the compartment of the controller when the coupling, mechanism is attached to the compartment of the controller and the first button is actuated.

\* \* \* \* \*